US008752111B2

(12) United States Patent
Roberts et al.

(10) Patent No.: US 8,752,111 B2
(45) Date of Patent: Jun. 10, 2014

(54) CONTENT CUSTOMIZATION PORTAL FOR MEDIA CONTENT DISTRIBUTION SYSTEMS AND METHODS

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 968 days.

(21) Appl. No.: 11/779,448

(22) Filed: Jul. 18, 2007

(65) Prior Publication Data

US 2008/0168495 A1    Jul. 10, 2008

Related U.S. Application Data

(60) Provisional application No. 60/879,003, filed on Jan. 5, 2007.

(51) Int. Cl.
*H04N 7/173* (2011.01)

(52) U.S. Cl.
USPC ........... 725/116; 725/114; 725/138; 725/144; 725/146

(58) Field of Classification Search
USPC .............. 725/74–85, 114, 116, 138, 144, 146
See application file for complete search history.

(56) References Cited

U.S. PATENT DOCUMENTS

| | | | | |
|---|---|---|---|---|
| 6,081,263 | A * | 6/2000 | LeGall et al. | 715/760 |
| 6,324,338 | B1 * | 11/2001 | Wood et al. | 386/83 |
| 6,486,907 | B1 * | 11/2002 | Farber et al. | 725/78 |
| 6,769,127 | B1 * | 7/2004 | Bonomi et al. | 725/39 |
| 6,774,926 | B1 * | 8/2004 | Ellis et al. | 348/14.01 |
| 2002/0056119 | A1 * | 5/2002 | Moynihan | 725/87 |
| 2002/0138500 | A1 * | 9/2002 | Bechtel et al. | 707/104.1 |
| 2003/0014328 | A1 * | 1/2003 | Lindner | 705/26 |
| 2004/0015999 | A1 * | 1/2004 | Carlucci et al. | 725/136 |
| 2004/0117829 | A1 * | 6/2004 | Karaoguz et al. | 725/46 |
| 2004/0117852 | A1 * | 6/2004 | Karaoguz et al. | 725/134 |
| 2004/0148633 | A1 * | 7/2004 | Skinner et al. | 725/86 |
| 2007/0028279 | A1 * | 2/2007 | Kim | 725/113 |
| 2007/0199019 | A1 * | 8/2007 | Angiolillo et al. | 725/39 |
| 2008/0015932 | A1 * | 1/2008 | Haeuser et al. | 705/14 |
| 2010/0153997 | A1 * | 6/2010 | Baumgartner et al. | 725/39 |

* cited by examiner

*Primary Examiner* — Jason Salce

(57) ABSTRACT

An exemplary system includes a content delivery subsystem configured to receive media content from a content provider and transmit the media content over a network to a content processing subsystem configured to process and provide the media content for presentation to an end user. The content delivery subsystem is further configured to maintain resource data associated with at least one of the media content and the content provider, make at least a subset of the resource data available to the content processing subsystem for inclusion in an end user interface, provide a content customization portal for access by the content provider, authenticate the content provider accessing the content customization portal, receive custom content from the authenticated content provider via the content customization portal, validate the custom content, and provide the custom content to the content processing subsystem for inclusion in the end user interface.

29 Claims, 14 Drawing Sheets

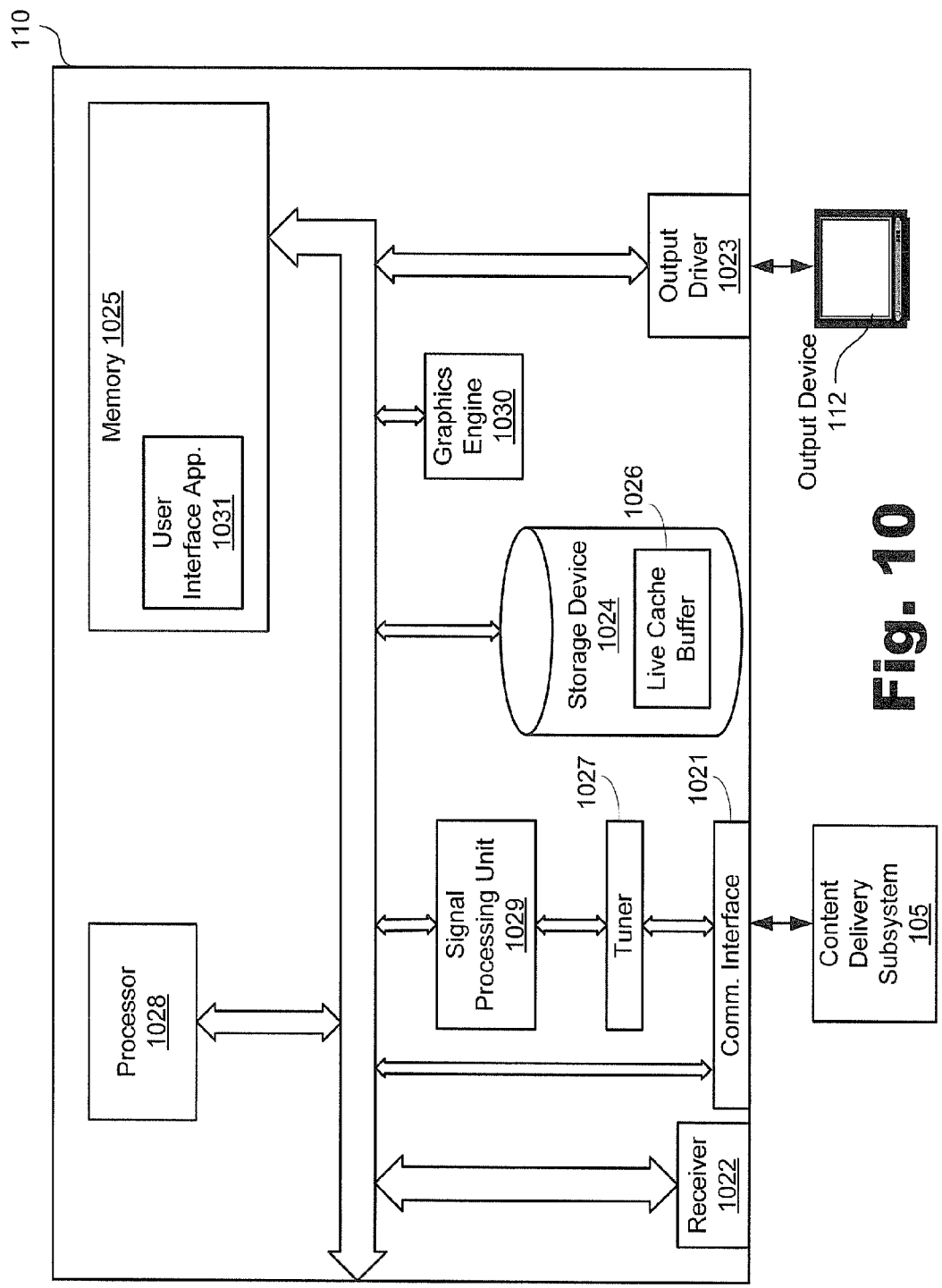

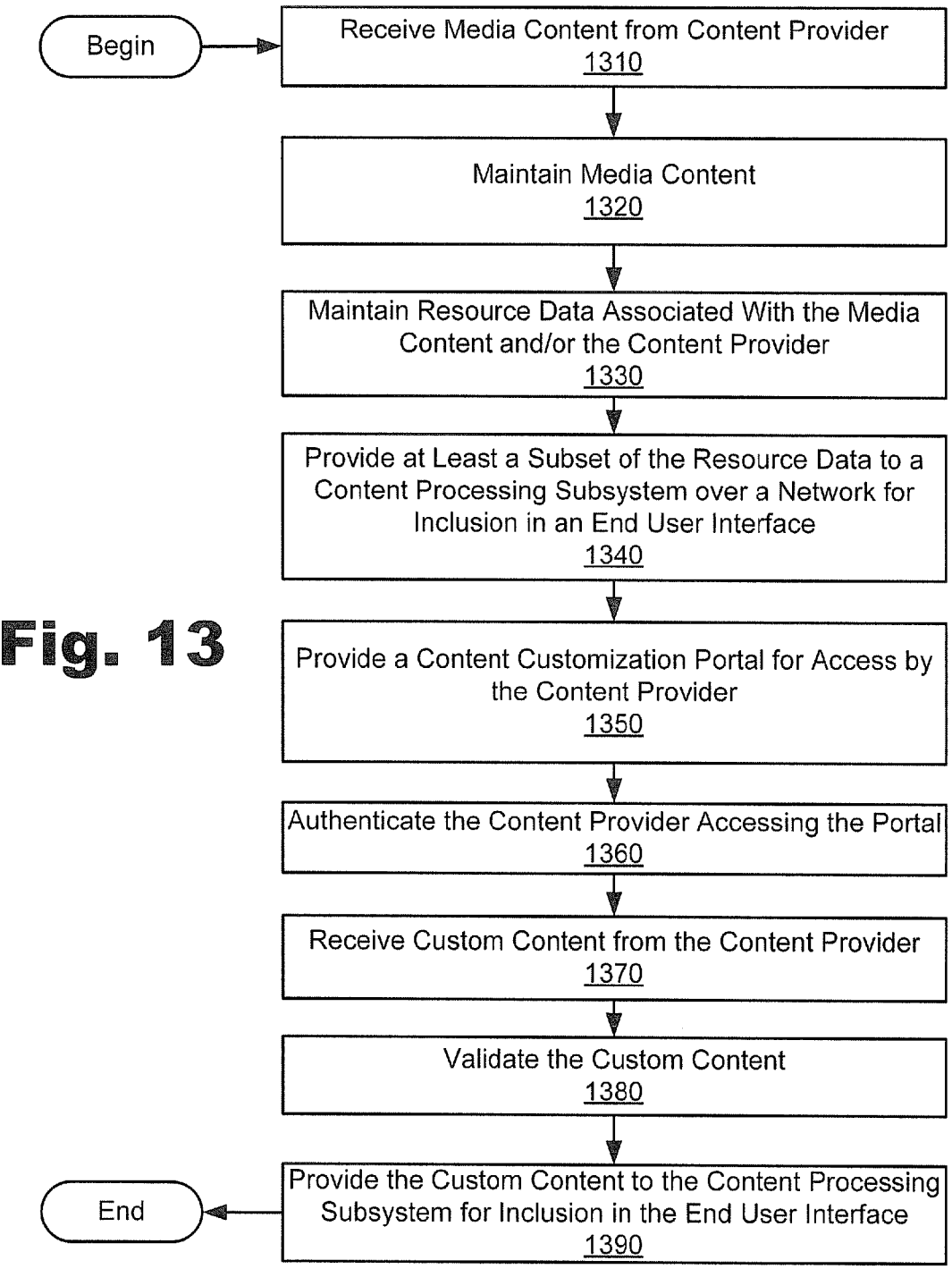

CONTENT CUSTOMIZATION PORTAL FOR MEDIA CONTENT DISTRIBUTION SYSTEMS AND METHODS

RELATED APPLICATIONS

The present application claims priority under 35 U.S.C. §119(e) to U.S. Provisional Patent Application No. 60/879,003 by Brian Roberts et al., filed on Jan. 5, 2007, and entitled USER INTERFACE FUNCTIONS FOR MEDIA CONTENT ACCESS SYSTEMS AND METHODS, the contents of which are hereby incorporated by reference in their entirety.

BACKGROUND INFORMATION

The set-top box ("STB") has become an important computing device for accessing media content services and the media content within those services. With an STB, a user is typically able to access media content and information associated with the media content, including program guide information descriptive of the media content and of the schedules and/or ordering information associated with the media content.

In a conventional subscriber television network, a content distributor (e.g., a carrier) generally receives media content from one or more media content providers and program guide data from an information service such as FYI Television, Inc. of Grand Prairie, Tex. The content distributor processes and makes the content and information available to subscriber STBs. Unfortunately, the third-party program guide data, or other such default data, may not always be adequate from the perspective of the content distributor and/or the content provider. For example, the program guide data may not be designed to market media content as zealously as may be desired by a content provider. In addition, it would be a significant burden for a content distributor to take on the responsibility of modifying program guide data and/or other data descriptive of media content for vast amounts of media content that may be received from potentially hundreds or even thousands of different content providers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 10 illustrates an exemplary content processing subsystem.

FIG. 13 illustrates an exemplary method of receiving, processing, and providing content, including media content and associated custom content.

DETAILED DESCRIPTION OF PREFERRED EMBODIMENTS

1. Introduction

Figure 1:
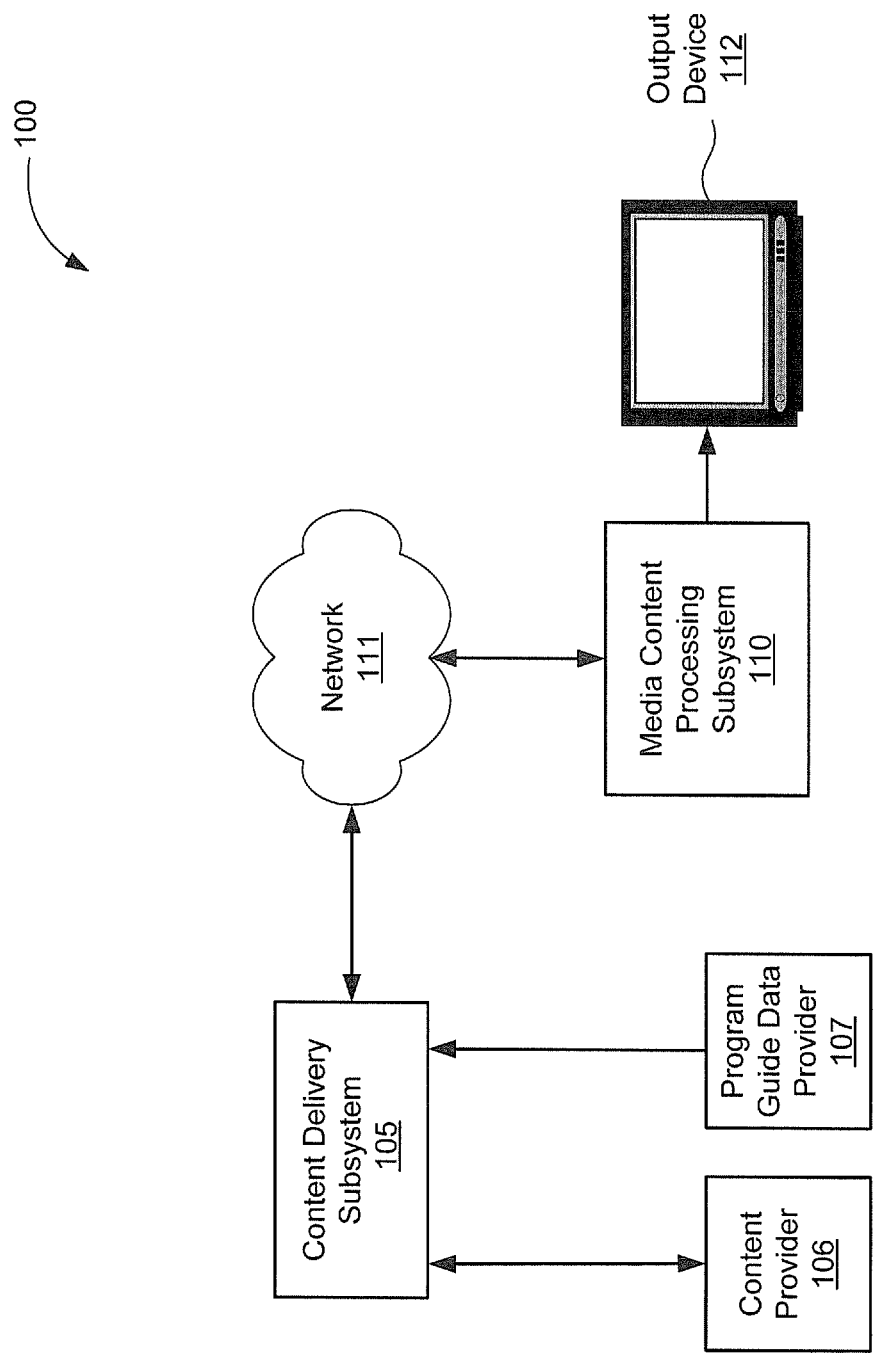
FIG. 1 illustrates an exemplary media content distribution system.

An exemplary content customization portal for media content distribution systems and methods is described herein. An exemplary system includes a content delivery subsystem configured to receive media content from a content provider. The content delivery subsystem is configured to distribute (e.g., transmit) the received media content to at least one media content processing subsystem (e.g., a set-top box), which is configured to process and provide the media content to an output device for presentation to an end user.

The content delivery subsystem is further configured to maintain resource data (e.g., program guide data, media content metadata, graphics, etc.) associated with the media content and/or the content provider and make at least a subset of the resource data available to the media content processing subsystem for inclusion in an end user interface (e.g., a program guide user interface). The content delivery subsystem may provide a content customization portal for access by the content provider, authenticate the content provider accessing the content customization portal, receive custom content from the authenticated content provider via the content customization portal, validate the custom content, and provide the custom content to the media content processing subsystem for inclusion in the end user interface. In certain examples, the custom content may be included in the end user interface based on an association between the custom content and the resource data. The association may be created based on content provider input received via the content customization portal. In certain examples, the custom content may be included in the end user interface in substitution of the resource data. In other examples, the custom content may be included in the end user interface in association with (e.g., together with) the resource data.

The content customization portal may include at least one tool enabling the content provider to provide and manage custom content (e.g., custom user interface content) associated with the content provider and/or media content provided by the content provider. Through the custom content portal, the content provider may provide input associating the custom content with the resource data. The content delivery subsystem may create at least one association between the custom content and the resource data based on the content provider input. In certain examples, the at least one tool includes at least one template representative of the end user interface. The template may include at least one placeholder configured to enable the content provider to associate the custom content with a spatial position in the template, and consequently in the corresponding end user interface.

When the media content processing subsystem generates and provides the end user interface to the output device for presentation to the end user, the custom content may be included in the end user interface based on the association between the custom content and the resource data as defined by the content provider. Accordingly, the content provider can provide and the end user is able to experience content that has been customized by the content provider.

Through the content customization portal, a content provider is able to remotely customize user interface content in accordance with the preferences of the content provider, including customizing content in a manner that the content provider believes will best market its media content to end users. Accordingly, the content provider can have a significant level of control for remotely providing, customizing, and managing information that will be made available to end users by a content distributor (e.g., over a subscriber television network).

II. Exemplary System View

FIG. 1 illustrates an example of a media content distribution system 100 (or simply the "system 100"). As shown in FIG. 1, the system 100 may include a content delivery subsystem 105 configured to communicate with a content provider 106 and a program guide data provider 107. The content delivery subsystem 105 may receive media content and custom content (described below) from the content provider 106. Program guide data may be received from the program guide data provider 107. Although not shown, other types of content or data may be received from these and/or other sources.

The system 100 may include a media content processing subsystem 110 configured to communicate with and receive a signal or data stream containing data representative of media content and/or other content (e.g., provider customized content and/or program guide data) from the content delivery subsystem 105 by way of a network 111. The media content processing subsystem 110 may be configured to process a media content stream provided by the content delivery subsystem 105, including recording and/or providing a media content program, or one or more components (e.g., video and/or audio components) of a media content program, to an output device 112 (e.g., a television, computer monitor, etc.) for presentation (e.g., display and/or audio broadcast) to an end user.

In some examples, the system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary media content access system 100 is shown in FIG. 1, the exemplary components illustrated in FIG. 1 are not intended to be limiting. Indeed, additional or alternative components and/or implementations may be used. Each of the components of system 100 will now be described in additional detail.

A. Content Delivery Subsystem

The content delivery subsystem 105 may include any device or devices (e.g., a content server) configured for receiving, storing, processing, or providing media content and other types of content (e.g., program guide data and provider customized content). The media content may include one or more media content programs, or one or more segments of the media content program(s). The term "media content program" as used herein may refer generally to any television program, on demand program, pay-per-view program, broadcast or narrowcast media program, IPTV content, video, movie, song, audio, or any segment, component, or combination of these or other forms of media content that may be viewed or otherwise experienced by a user.

The content delivery subsystem 105 may be configured to communicate with the media content processing subsystem 110 via network 111, which may include one or more types of communications networks (and communications links thereto), including, but not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo network), an optical fiber network, a local area network, any other suitable network, and any combination of these networks.

The media content processing subsystem 110 and content delivery subsystem 105 may communicate using any known communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), User Datagram Protocol ("UDP"), socket connections, Ethernet, and other suitable communications technologies. Devices and/or applications operating on devices included in the content delivery subsystem 105 may communicate with one another using any of the communication technologies and/or networks listed herein.

The content delivery subsystem 105 may receive media content from one or more content providers, such as content provider 106. Content provider 106 may include any entity (e.g., individual or organization) and/or device(s) providing, or associated with the providing of, media content to the content delivery subsystem 105. A content provider 106 may include, but is not limited to, a television network, media production entity, studio, independent media content producer, individual, or any other entity providing media content for distribution. Any suitable communication technologies may be used for communications between the content delivery subsystem 105 and the content provider 106, including any of the communication technologies mentioned herein.

In addition to media content, content delivery subsystem 105 may be configured to receive, maintain (e.g., store in memory), process, and/or provide other types of content or data, including, but not limited to, media content metadata (e.g., media program title, description, start time, end time, duration, rating, channel identifier, etc.), program guide data, configuration files, text data, image files, other graphics, and/or other content or data associated with the media content and/or the content provider 106. Such content and data, which may be referred to collectively as "resource data," may be generated or received by the content delivery subsystem 105.

For example, the content delivery subsystem 105 may receive resource data in the form of media content metadata from the content provider 106 and program guide data from one or more third party program guide data providers, such as program guide data provider 107. Program guide data provider 107 may include any third party entity (e.g., individual or organization) and/or device(s) providing, or associated with the providing of, program guide data and/or a program guide data service (such as a service provided by FYI Television, Inc. of Grand Prairie, Tex.) to the content delivery subsystem 105. The program guide data may include any data descriptive of or otherwise associated with media content, media content transmission schedules, ordering information, etc. Any suitable communication technologies may be used for communications between the content delivery subsystem 105 and the program guide data provider 107, including any of the communication technologies mentioned herein.

Figure 2:
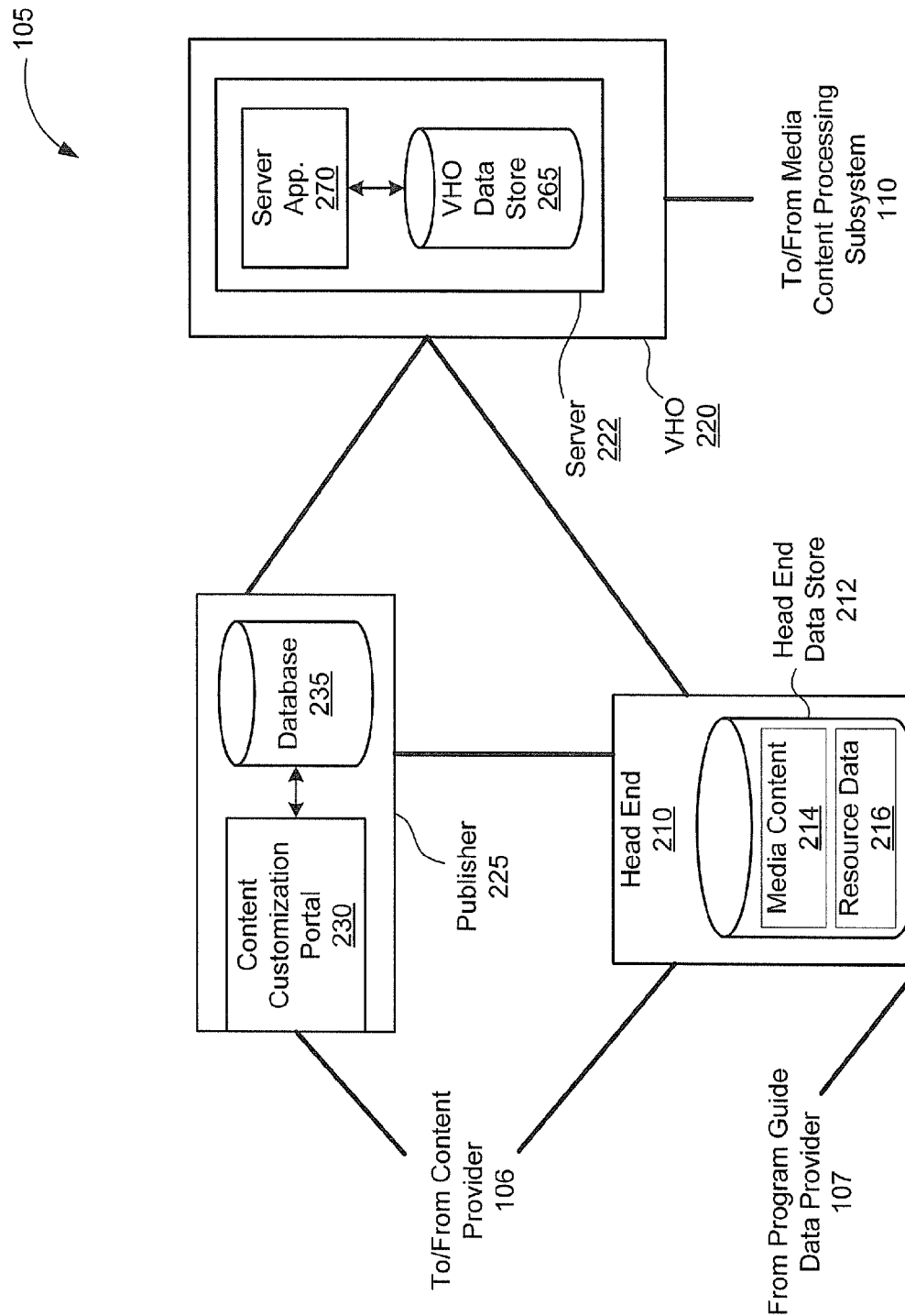
FIG. 2 illustrates an exemplary content delivery subsystem.

FIG. 2 illustrates an exemplary content delivery subsystem 105. The example illustrated in FIG. 2 is illustrative only and not limiting in any sense. Alternative implementations may include additional, fewer, or alternative components and may be arranged in alternative configurations. Components of the content delivery subsystem 105 may communicate using any of the communication technologies mentioned herein.

In the example illustrated in FIG. 2, a head end 210 may receive media content from content provider 106. While FIG. 2 shows the head end 210 configured to receive media content from one content provider 106, this is illustrative only. Head end 210 may receive, and typically does receive, media content from multiple content providers 106. The media content may be maintained in a head end data store 212, as represented by reference number 214 in FIG. 2. Head end 210 may also maintain resource data 216, which may include any of the content and/or data described above.

Media content 214 and resource data 216 maintained by the head end 210 may be provided (e.g., distributed) to one or more video hub offices such as video hub office ("VHO") 220, as is well known. The content and/or data may be transmitted using any of the communication networks and technologies mentioned herein, including a fiber optic media distribution network, for example. VHO 220 is known for serving as a point of aggregation and distribution for media content and resource data. For example, a media signal, such as a video signal encoded as a Motion Picture Experts Group-2 ("MPEG 2") stream, may be provided from head end 210 through a media distribution network (e.g., a subscriber television network) to VHO 220, which may transmit a media signal to media content processing subsystem 110. In some examples, the VHO 220 may include a server 222 configured to transmit the media signal to the media content processing subsystem 110. As described further below, the media content processing subsystem 110 may process the media signal and provide media content carried in the stream to output device 112 for presentation to an end user.

The head end 210 may also provide resource data 216 to the VHO 220, which may in turn provide the resource data 216, or a subset of the resource data 216, to the media content processing subsystem 110 for inclusion in one or more user interfaces. As described below, the media content processing subsystem 110 may use at least a subset of the resource data 216 to populate user interfaces, which may be generated and provided to output device 112 for presentation to an end user. Such user interfaces may be referred to as "end user interfaces." As an example, the resource data 216 may include images and/or program guide data used to populate one or more program guide end user interfaces.

As shown in FIG. 2, content delivery subsystem 105 may include a publisher 225 configured to communicate with content provider 106. Publisher 225 may be included on one or more computing devices configured to communicate with media content provider 106, including providing a content customization portal 230 to the media content provider 106. Publisher 225 may also communicate with, and be separate from or part of (e.g., integrated within), the head end 210.

Any suitable communications technologies may be used for communications between the publisher 225 and the content provider 106, including any of the communication technologies mentioned herein. For example, the Internet, World Wide Web, and/or a virtual private network ("VPN") tunnel may be used.

Content customization portal 230 may be accessed by the content provider 106 (e.g., from a content provider access device). In certain implementations, publisher 225 is configured to authenticate the content provider 106 before granting access to the content customization portal 230. Authentication may be by any suitable process, including verifying login information (e.g., username and password) and/or authenticating a terminal device and/or Internet Protocol address associated with the content provider 106, for example.

The authentication information may be used to identify the content provider 106 and any media content 214 and/or resource data 216 associated with the content provider 106. In certain implementations, for example, authentication information may be used to identify a content provider identifier (e.g., a "station ID"), which may be associated with particular instances of media content 214 and/or resource data 216 stored at the head end 210. The content provider identifier may be used by the head end 210 to access content and/or data associated with the content provider 106 such that the content provider 106 is able to provide custom content and associate it with media content provided by the content provider 106 and/or resource data 216 associated with the media content and/or the content provider 106.

The content customization portal 230 may include at least one tool configured to enable the content provider 106 to provide and/or manage custom content. The tool(s) may include any interface or functionality configured to facilitate reception and management of custom content. Examples of such tools may include, but are not limited to, a customizable library of custom content elements, a library of media content (e.g., media content programs), media content schedule information, a library of user interface templates, custom content placeholders, template preview screens, template fields of selectable options (e.g., media program titles), custom content constraints, and custom content recommendations, for example.

Using one or more of the tools in the content customization portal 230, content provider 106 is able to provide input (i.e., content provider input) associating custom content and specific resource data 216. Based on the input, publisher 225 may create at least one association between the custom content and the resource data 216. An association may include a substitution of one data instance for another in a data store or any electronic data representation between data instances, including one or more pointers, memory address offsets, or data structure indices, for example. An association may be useful for downstream devices such as VHO 220 and/or media content processing subsystem 110 for matching custom content with corresponding resource data 216. For example, an association can be used to identify when and where content custom will be included in one or more end user interfaces.

The custom content may be included in an end user interface in association with (i.e. together with) and/or in substitution of resource data 216. Whether custom content is included together with or in substitution of resource data 216 may be based on the specific instance of resource data 216 to which the custom content is associated. As an example of when custom content may be included as a substitute for resource data 216 in an end user interface, a specific instance of resource data 216 may include a media program textual description received from program guide data provider 107. This resource data 216 may, by default, be configured for inclusion in a program guide end user interface. The content provider 106 may provide custom text, and, based on content provider input, the publisher 225 may create an association, direct or indirect, between the default text and the custom text such that when data representative of the program guide end user interface is generated by the media content processing subsystem 110, the custom text is used in substitution of the default text to populate the user interface.

As an example of when custom content may be included in an end user interface in association with resource data 216, a specific instance of resource data 216 may include a media program title corresponding with a media content program. This resource data 216 may, by default, be configured for inclusion in a program guide end user interface. The content provider 106 may provide a custom image, and, based on content provider input, the publisher 225 may create an association, direct or indirect, between the media program title and the custom image such that when data representative of the program guide end user interface is generated by the media content processing subsystem 110, the custom image is used in association with the media content title to populate the user interface. That is, the media content title and the custom image may be included in the user interface in association with one another.

Figure 3:
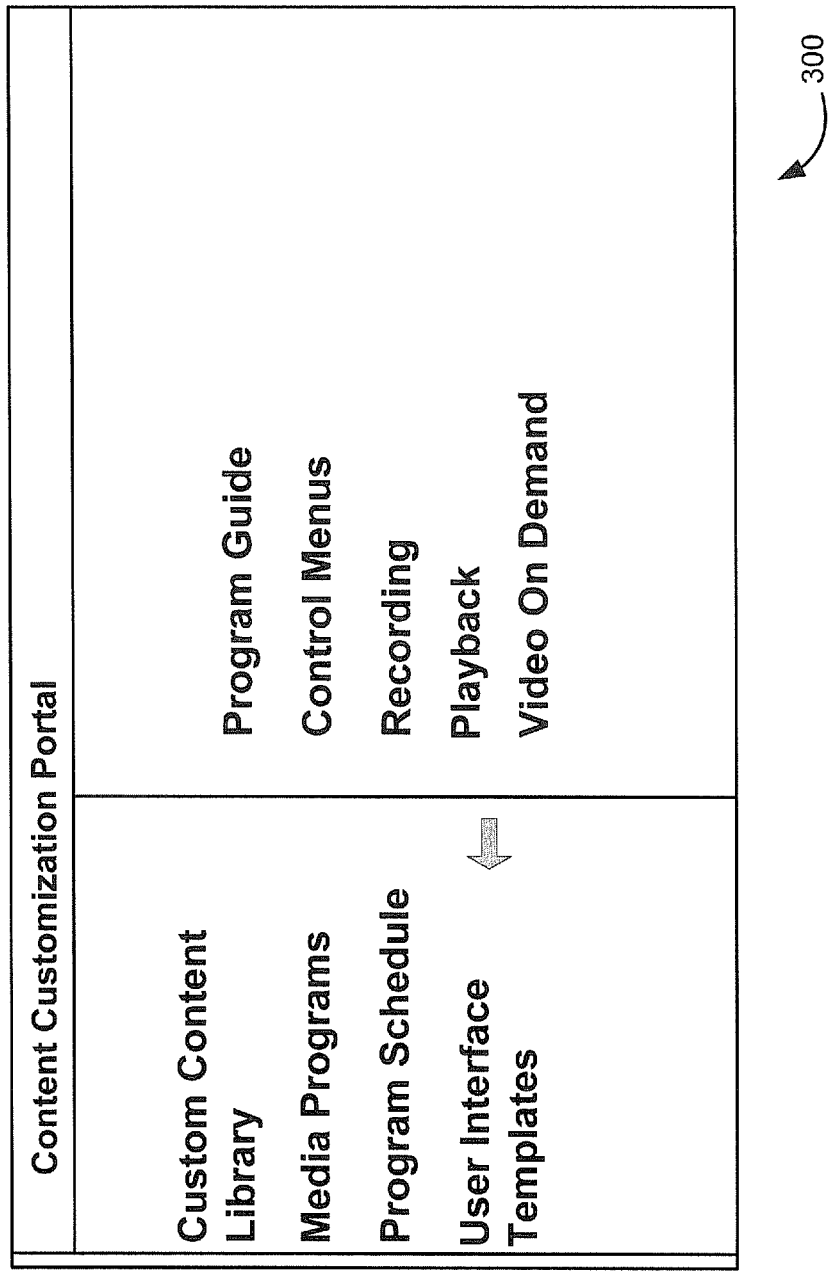
FIG. 3 illustrates an exemplary graphical user interface that may be presented in a content customization portal.

To facilitate an understanding of the content customization portal 230 and tools that may be provided therein, several exemplary graphical user interfaces and tools that may be provided through the portal 230 will now be described. FIG. 3 illustrates an exemplary graphical user interface 300 ("GUI 300") that may be provided in the content customization portal 230 for consideration and use by an authenticated content provider 106. GUI 300 may display a menu of selectable options such as "custom content library," "media programs," "program schedule," and "user interface templates" options, for example.

The "custom content library" option may be associated with and selected to access one or more tools for building and managing a library of custom content. Accordingly, content provider 106 can create and manage a library of personalized custom content. For example, the content provider 106 may upload a custom image such as a logo image associated with the content provider 106, a media content program provided by the content provider 106, and/or resource data 216 associated with the media content program. Publisher 225 may store the custom image (in database 235 of FIG. 2, for example) as part of a library of custom content instances associated with the content provider 106. A predetermined or configurable amount of storage space may be made available to the content provider 106 for storage of custom content.

The "media programs" option may be associated with and selected to access one or more tools for looking up media programs associated with (e.g., provided by) the content provider 106. For example, when this option is selected, a list of such media programs included in a library may be displayed. From this list, content provider 106 may select a media program and access additional information associated with the media program, including schedule information, user interface templates, and/or custom content already associated with the media program. The portal 230 may provide one or more tools enabling the content provider 106 to associate custom content with a selected media program.

The "program schedule" option may be associated with and selected to access one or more tools for accessing schedule data (e.g., program guide schedule data) descriptive of scheduling for media content associated with content provider 106. For example, when this option is selected, schedule data for such media programs may be displayed. For a content provider 106 associated with a particular media channel or multiple media channels, the schedule data may be presented as one or more rows or columns of schedule information organized by media channel. Such a presentation may be similar to rows of program schedule information included in a standard program guide graphical user interface. From the schedule data, content provider 106 may select a media program associated with a particular schedule (e.g., transmission schedule) and associate custom content with the selected media program and schedule.

The "user interface templates" option may be associated with and selected to access one or more template tools for associating custom content with user interfaces. In FIG. 3, the "user interface templates" option has been selected as represented by an arrow pointing at this option. When the option is selected, a menu of sub-options may be presented. As shown in FIG. 3, sub-options to the "user interface templates" option may include, but are not limited to, a "program guide" template option, a "control menus" template option, a "recording" template option, a "playback" template option, and a "video on demand" template option. Each of these options may be associated with one or more user interface templates, which templates may be representative of corresponding user interfaces that can be generated and presented to end users. Templates may be categorized and grouped by type within template options such as those listed above.

Figure 4:
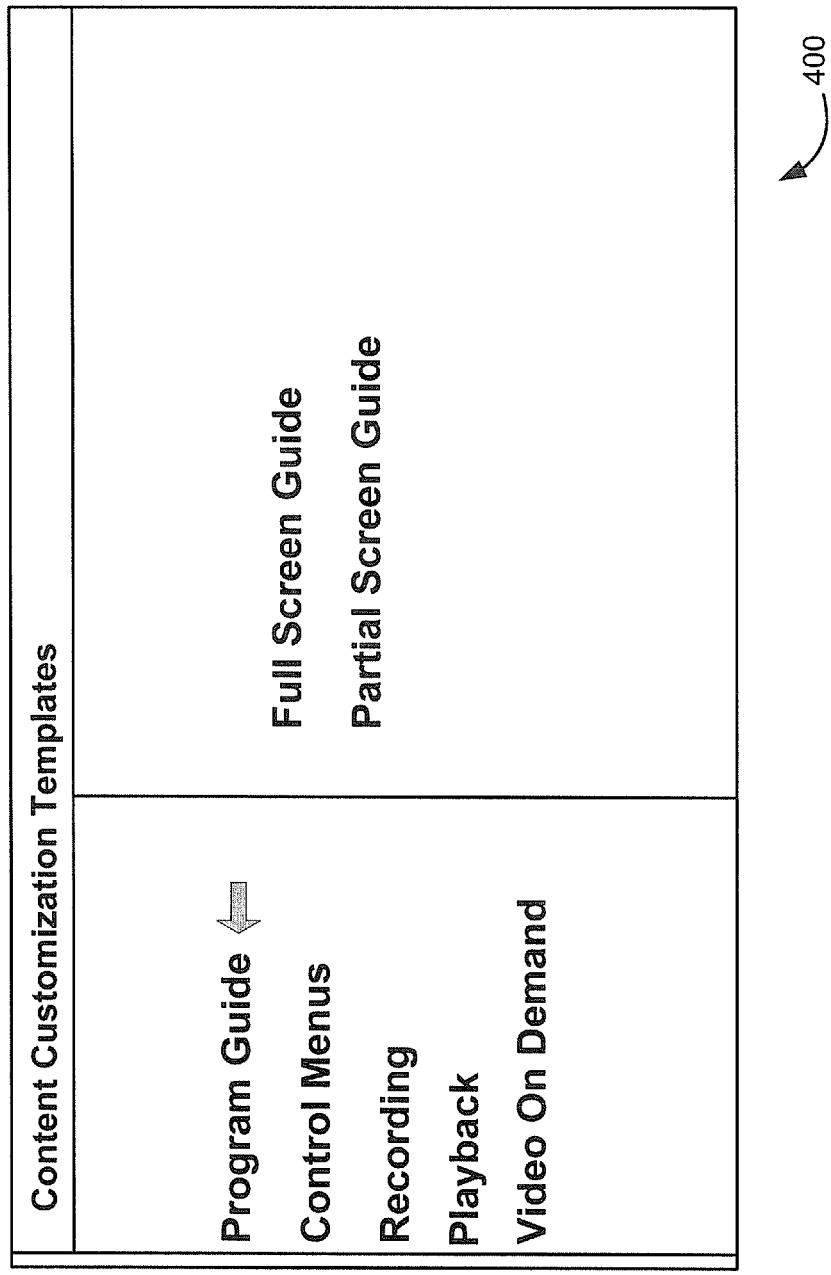
FIG. 4 illustrates another exemplary graphical user interface that may be presented in the content customization portal.

When one of the template sub-options is selected, a list of one or more templates associated with the selected sub-option may be displayed. For example, FIG. 4 illustrates another graphical user interface 400 ("GUI 400") displaying a list of program guide templates. GUI 400 and the list of program guide templates may be displayed in response to a selection of the "program guide" templates option shown in FIG. 3.

As shown in FIG. 4, the list of program guide templates may include, but is not limited to, a "full screen guide" template and a "partial screen guide" template. When one of these templates is selected, a corresponding template may be presented in the content customization portal 230.

Figure 5:
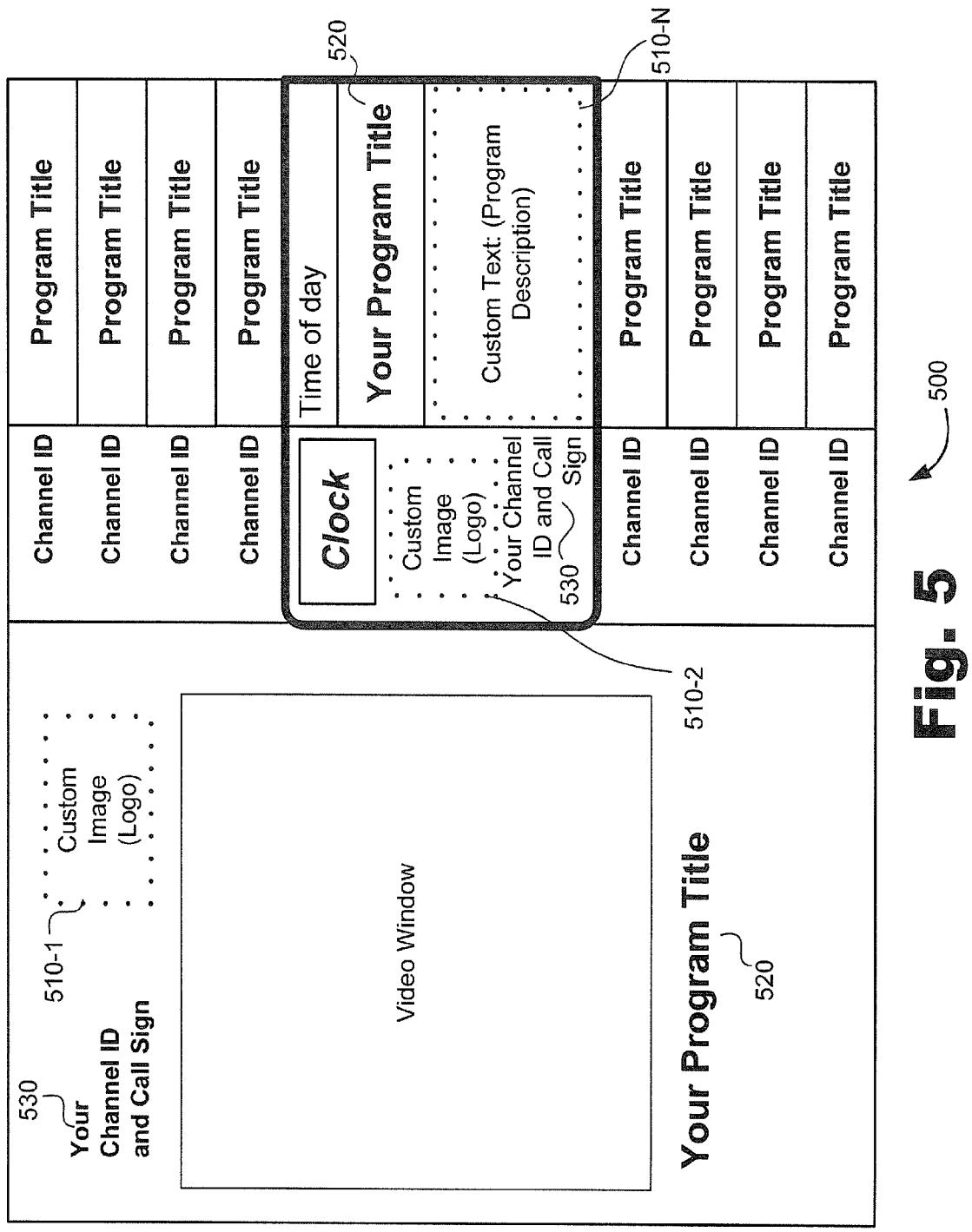
FIG. 5 illustrates an exemplary partial screen program guide template that may be presented in the content customization portal.

FIG. 5 illustrates an exemplary graphical user interface 500 ("GUI 500") including a partial program guide template that may be displayed when the "partial screen guide" template option of FIG. 4 is selected. The partial program guide template may include one or more tools configured to enable the content provider 106 to identify custom content for inclusion in a program guide end user interface associated with and represented by the template. As shown in FIG. 5, the tools may include placeholders 510-1 through 510-N (collectively referred to as "placeholders 510") displayed in a visual layout of the partial program guide template. The placeholders 510 may be positioned within the template and indicate approximate spatial positions where corresponding custom content will be positioned in an associated user interface that may be presented to an end user.

In addition to indicating spatial positions, the placeholders 510 may include recommendations, descriptions, and/or other information. For example, placeholder 510-1 indicates an "image" type of custom content. Placeholder 510-1 also includes a recommendation that the corresponding spatial position be used for custom content in the form of a logo image. This is simply a recommendation and does not necessarily limit the content provider 106 to providing only a logo-type image. Other images, such as a thumbnail image of a media program poster or an image of a scene from a corresponding media content program may be provided. Placeholder 510-1 may also include a dashed line indicating a recommended or maximum allowable spatial size for a custom image. Placeholder 510-2 is similar to placeholder 510-1 but differs in the spatial size indicated by the dashed line.

Placeholder 510-N indicates a position in the partial program guide template where custom text may be placed. Placeholder 510-N also includes a recommendation that the position be used for program description text. Similar to placeholders 510-1 and 510-2, the dashed line around placeholder 510-N may indicate a recommended or maximum allowable spatial size (e.g., area) for the custom text.

The information associated with the placeholders 510 in FIG. 5 is illustrative and not limiting in any sense. Other information may be provided in other examples. Examples of information that may be provided in association with placeholders 510 may include, but is not limited to, constraints or other information related to content format types (e.g., file formats), spatial sizes (e.g., pixel area or measurable screen size area), memory storage limits, resolutions, numbers of characters, types of characters, character font attributes (e.g., font size), and any other descriptor of custom content or constraints associated with custom content that can be associated with the placeholders 510.

Any such information may be displayed in GUI 500 and may be accessible through the placeholders 510 in GUI 500. For example, any of the placeholders 510 may be selectable by the content provider 106. When a placeholder 510 is selected, additional information and/or functionality related to the placeholder 510 may be provided in the content customization portal 230. For instance, a pop-up window having predetermined information about the placeholder 510 may be launched in GUI 500.

Through the content customization portal 230, content provider 106 may provide custom content and associate it with a placeholder 510. For example, content provider 106 may select a placeholder 510 included in a template and then identify (e.g., upload or select from a library of custom content) custom content to be associated with the selected placeholder 510.

As shown in FIG. 5, certain information displayed in GUI 500 may be generic. For example, "Channel ID" may identify where a specific channel identifier will be positioned in an associated end user interface. Similarly, "Your Program Title" may identify where a specific program title of a media content program associated with the content provider 106 will be positioned in the end user interface. Such background information may be generic in GUI 500 when the content provider 106 selects a template to work with before first identifying a media channel or media content program. However, GUI 500 may enable the content provider 106 to select a media channel and/or media content program to be associated with custom content. For example, the content provider 106 may select a "Your Program Title" field 520 in the GUI 500 to launch a list of media content programs (e.g., a list of programs included in a media content library) associated with the content provider 106. The content provider 106 may select from the list to specify a media content program to be associated with custom content such as a program description corresponding with placeholder 510-N, for example. In response to this selection, any "Your Program Title" fields 520 in GUI 500 may be populated with the title of the selected media content program. The content provider 106 may similarly launch and select from a list of media channels associated with the content provider 106 to populate "Channel ID" fields 530 in GUI 500.

Further, the publisher 225 may be configured to prompt the content provider 106 for certain information in response to a predefined event. For example, the content provider 106 may provide input associating a custom content instance with placeholder 510-N before selecting a media program title in field 520. The content provider 106 may then be prompted to select a media program title to be associated with the custom content instance.

The content customization portal 230 may also enable the content provider 106 to first select a media channel, media content program, or program schedule (e.g., using the options of FIG. 3) before selecting a template. When a template menu option is subsequently selected and the corresponding template launched, the associated fields in the template may be automatically populated with the associated information (e.g., a media program title).

Figure 6:
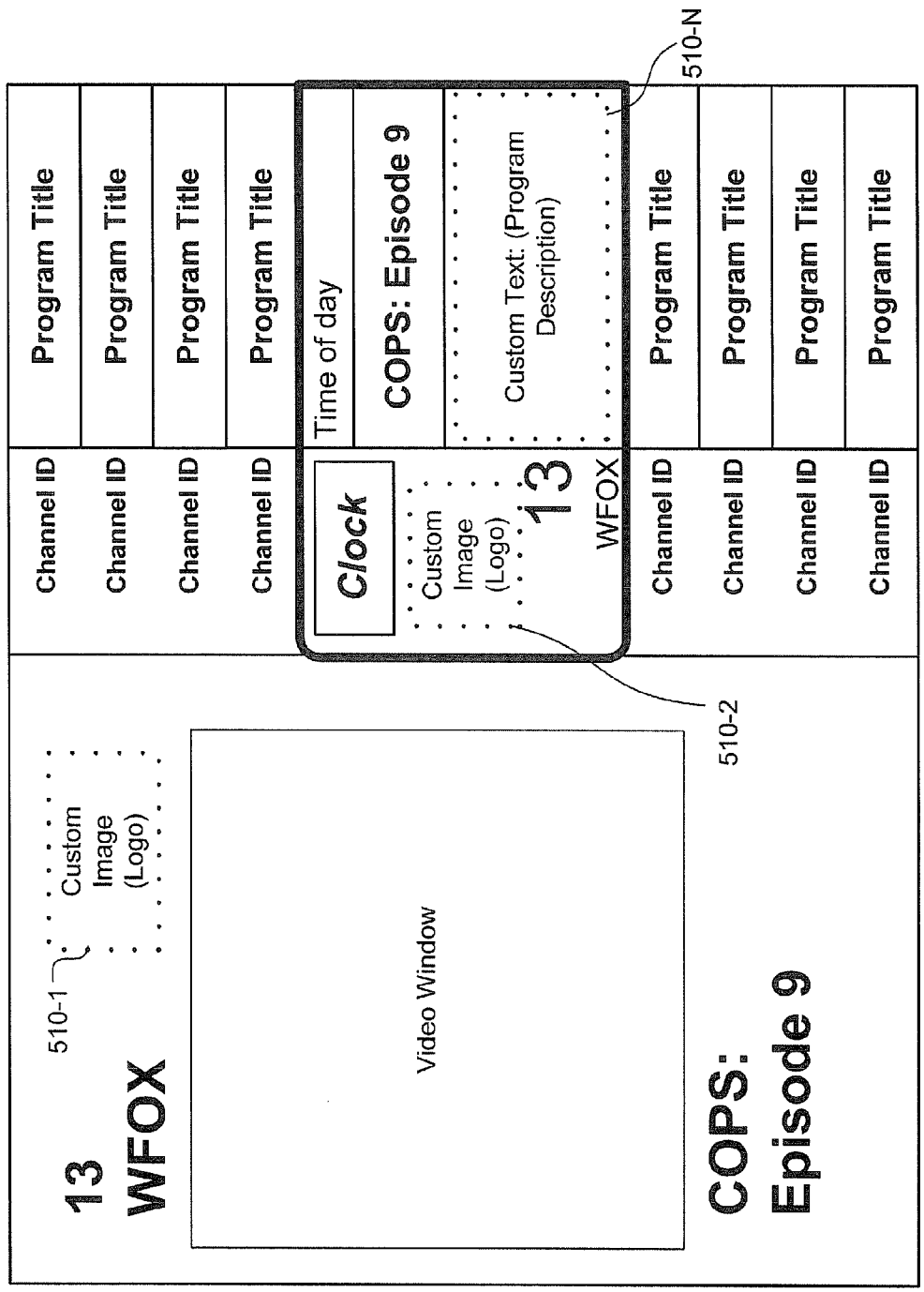
FIG. 6 illustrates another exemplary partial screen program guide template that may be presented in the content customization portal.

FIG. 6 illustrates a graphical user interface 600 ("GUI 600") including another partial program guide template in which a channel ID, call sign, and program title specific to the content provider 106 and one of its associated media content programs is populated. In the example shown, the channel ID is "13" the call sign is "WFOX," and the program title is "COPS: Episode 9." Custom content that is associated with the placeholders 510 in this template may correspond with the channel ID, call sign, and program title shown. For example, the content provider 106 may provide a custom textual description for the television show know as "COPS: Episode 9" using placeholder 510-N, as well as a custom image for the specific channel ID and call sign using placeholder 510-1 or 510-2.

Figure 7:
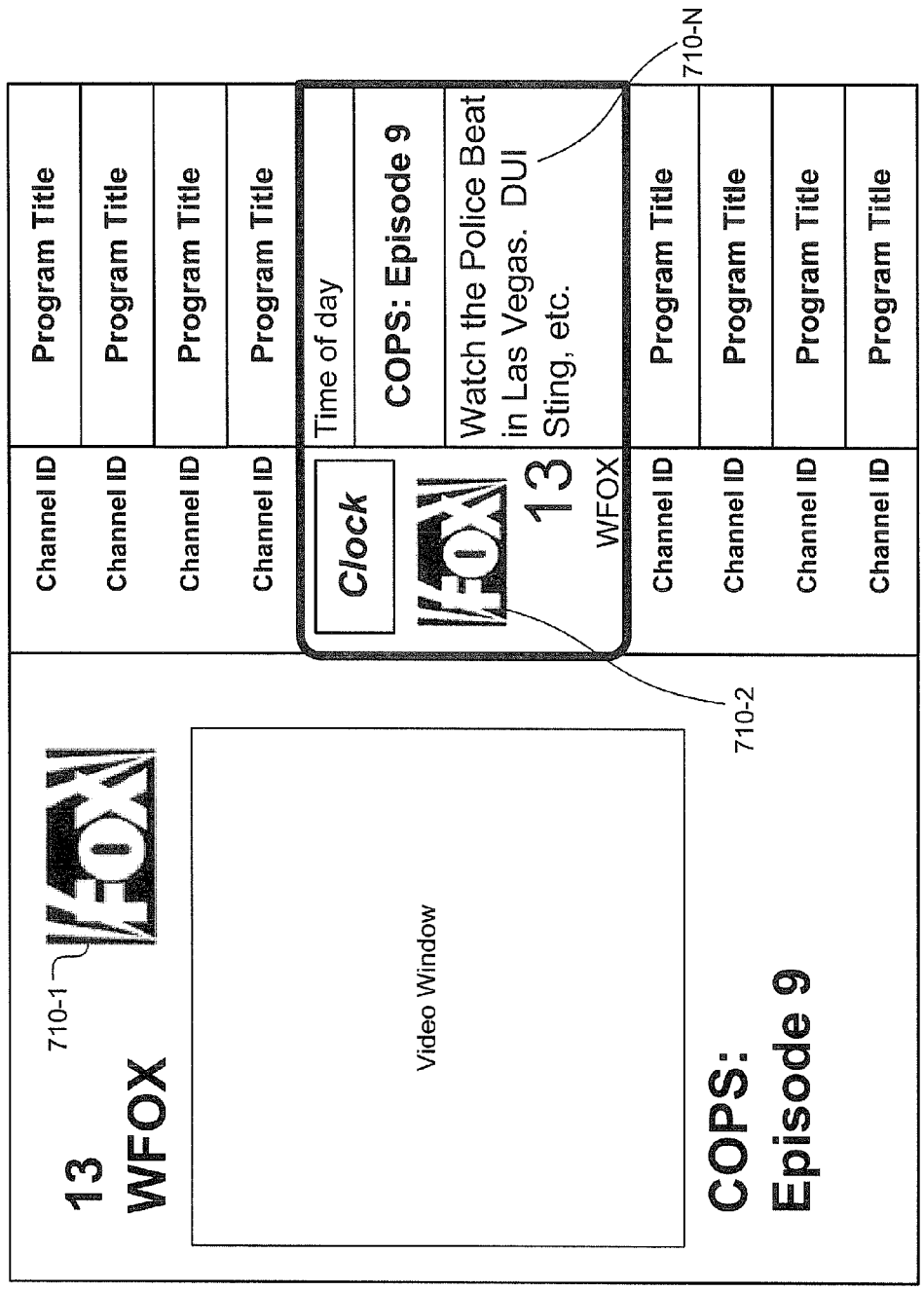
FIG. 7 illustrates custom content in a program guide template preview that may be presented in the content customization portal.

The portal 230 may provide previews of custom content within templates or end user interfaces. FIG. 7 illustrates a graphical user interface 700 ("GUI 700") including the partial program guide template of FIG. 6 with custom content instances 710-1 through 710-N displayed in place of placeholders 510-1 through 510-N, respectively. In this or similar manner, content provider 106 is able to preview custom content within a template context.

The templates shown in FIGS. 5-7 are illustrative only. Other templates, including templates representative of any user interface that may be presented to an end user and that may include media content 214 and/or resource data 216, may be provided to content provider 106 through the content customization portal 230.

Figure 8:
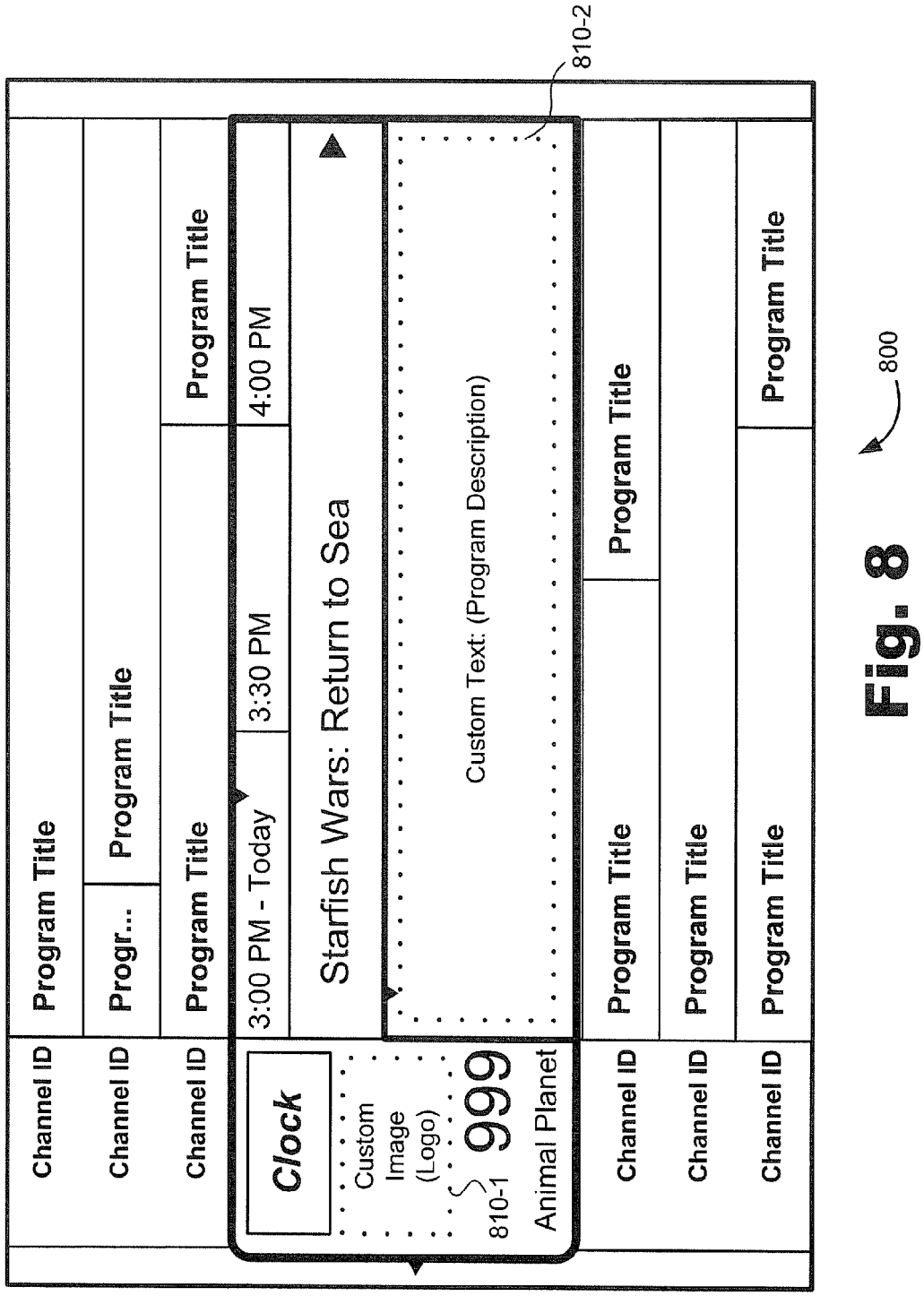
FIG. 8 illustrates an exemplary full screen program guide template that may be presented in the content customization portal.
Figure 9:
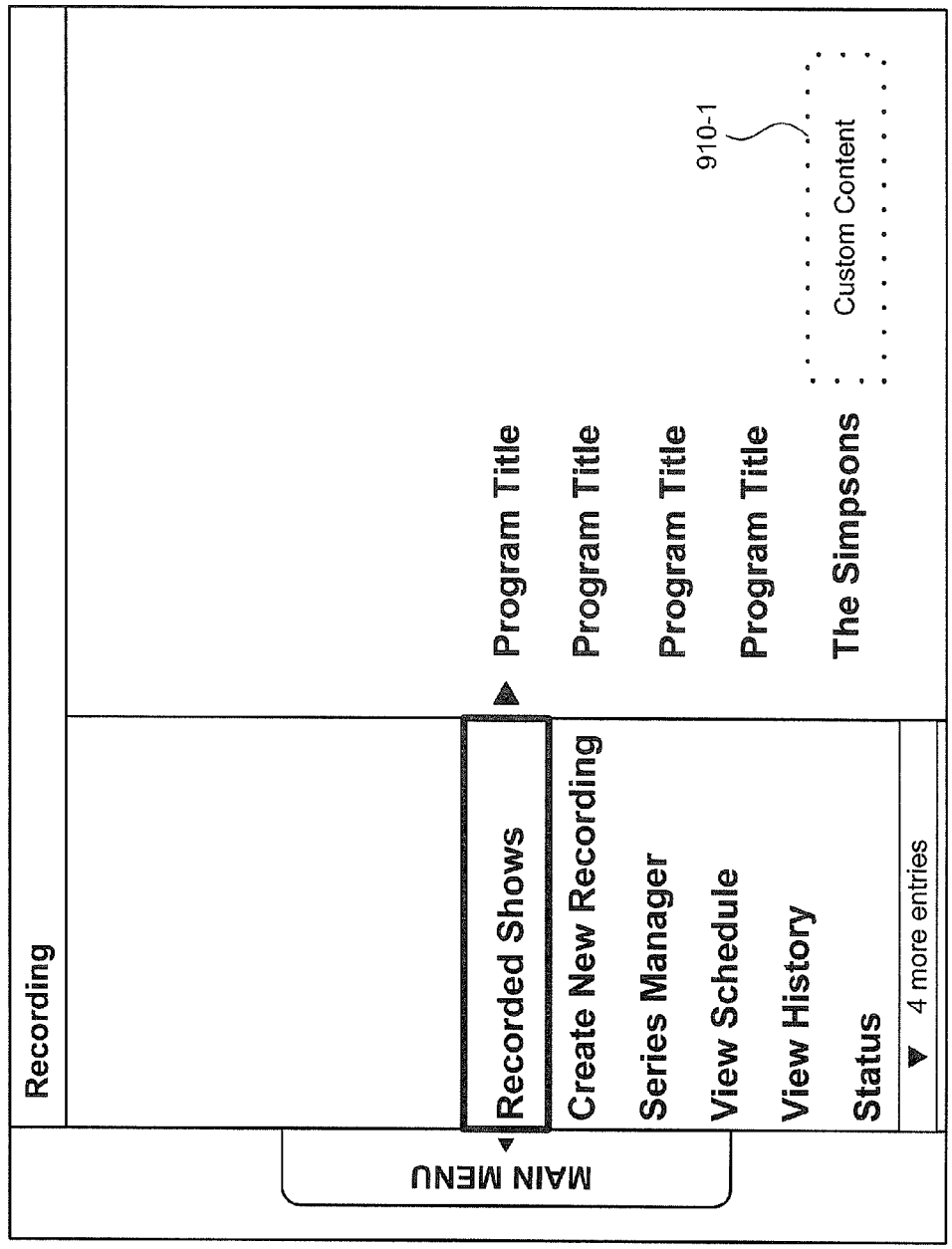
FIG. 9 illustrates an exemplary media recording view template that may be presented in the content customization portal.

As further examples, FIGS. 8 and 9 illustrate graphical user interfaces including other exemplary templates and placeholders that may be presented via the portal 230. FIG. 8 illustrates a graphical user interface 800 ("GUI 800") including a full screen program guide template, which may be associated with a program guide user interface that can be presented to an end user. The full screen program guide template includes placeholders 810-1 and 810-2 (collectively "placeholders 810), which may be similar to placeholders 510-2 and 510-N, respectively. FIG. 9 illustrates a graphical user interface 900 ("GUI 900") including a recording menu template, which may be representative of a recording menu user interface that can be presented to an end user. The recording menu template includes placeholder 910-1, which may function similar to any of the placeholders 510, 810 described above, thereby enabling the content provider 106 to identify custom content (e.g., an image and/or text) to be associated with the appearance of a media content program title (e.g., "The Simpsons") in a menu of recorded media content (e.g., media content that has been recorded by the media content processing subsystem 110). In similar fashion, other templates, including templates associated with other end user interfaces, may be provided via the portal 230.

The content customization portal 230 may provide content provider 106 with at least one tool for controlling the scope of application of specific instances of custom content. That is, the portal 230 may enable the content provider 106 to specify in which end user interfaces a particular instance of custom content will be included. For example, content provider 106 may provide and associate a custom image only with occurrences of a particular media program or related resource data 216 in a particular user interface (e.g., inclusion of the corresponding media program title in a recording menu user interface). As another example, content provider 106 may associate an instance of custom content with each possible appearance of a particular media content program or related resource data 216 in any user interface, As yet another example, an instance of custom content such as a station logo may be associated, wherever allowed, with all appearances of a station or channel identifier. In such a manner, the scope of application of custom content can be configured by the content provider 106, whether the scope is on an individual media program basis, on a particular user interface basis, on an individual channel basis, on a global basis, or any combination thereof.

Returning now to FIG. 2, publisher 225 may be configured to subject received custom content to a validation process. The validation process, which may include manual and/or automatic steps, may be used to check custom content before it is published. The validation process may be designed to filter distasteful, inappropriate, or otherwise undesirable custom content before it is made available (e.g., published) to end users. In one example, one or more agents of a media content distributor (e.g., a carrier) may manually validate received custom content based on predetermined guidelines. In another example, publisher 225 may perform a first level of validation procedures such as searching for keywords, for example, and one or more agents of a media content distributor may perform a second level of validation procedures based on the results of the first level.

When custom content is not validated, publisher 225 may be configured to notify content provider 106 via the portal 230. A reason for the failed validation may also be provided to help the content provider 106 understand the validation process and/or requirements. Database 235 may store pre-validation and/or post-validation custom content.

When custom content is validated, it may be published. Publisher 225 may publish custom content by providing or otherwise making it available to VHO 220 for distribution. VHO 220 may receive and store the custom content. As shown in FIG. 2, the VHO 220 may include server 222 having a VHO data store 265 and running a server application 270. Content, including media content 214, custom content, and resource data 216 may be stored in VHO data store 265 and may be provided by the VHO 220 to the media content processing subsystem 110. In particular, the VHO 220 may provide content to the media content processing subsystem 110 for inclusion in one or more user interfaces. The media content processing subsystem 110 may receive content from the VHO 220 in any suitable manner, including any of the ways described in co-pending U.S. patent application Ser. No. 11/693,267, entitled "Resource Data Configuration For Media Content Access Systems And Methods," filed Mar. 29, 2007, and hereby fully incorporated herein by reference in its entirety.

The media content processing subsystem 110 can receive content from VHO 220, process, and provide the content to an output device 112 for presentation to an end user. An exemplary media content processing subsystem 110 and functionality for processing custom content and generating user interfaces will now be described in detail.

B. Media Content Processing Subsystem

FIG. 10 is a block diagram of an exemplary media content processing subsystem 110 (or simply "processing subsystem 110"). The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible devices that receive and process digital and/or analog media content. Hence, an exemplary processing subsystem 110 may include, but is not limited to, a set-top box ("STB"), a home communication terminal ("HCT"), a digital home communication terminal ("DHCT"), a stand-alone personal video recorder ("PVR"), a television set, a DVD player, a video-enabled phone, and/or a personal computer.

While an exemplary processing subsystem 110 is shown in FIG. 10, the exemplary components illustrated in FIG. 10 are not intended to be limiting. Indeed, additional or alternative components and/or implementations may be used. Various components of the processing subsystem 110 will now be described in additional detail.

1. Communication Interfaces

As shown in FIG. 10, the processing subsystem 110 may include a communication interface 1021 configured to receive media content in any format from the content delivery subsystem 105 or from any other suitable media content source. The communication interface 1021 may include any device, logic, and/or other technologies suitable for receiving signals and/or data representative of media content and/or other content. In some examples, the communication interface 1021 may include a single port configured to receive media content from the media content delivery subsystem 105 and/or from any other source (e.g., from another media content processing subsystem, another server, etc.) For example, the communication interface 1021 may include or be connected to a broadband connection, which can enable the processing subsystem 110 to receive media content on a single port from multiple sources. In other examples, multiple ports may be used. The communication interface 1021 may be configured to interface with any suitable communication media, protocols, and formats, including any of those mentioned above.

The processing subsystem 110 may also include a receiver 1022 configured to receive one or more input commands from one or more user input devices such as an infrared remote control device, as is well known.

The processing subsystem 110 may also include an output driver 1023 configured to interface with or drive the output device 112. The output driver 1023 may include any combination of hardware, software, and firmware as may serve a particular application. As instructed by one or more processors of the processing subsystem 110-1, the output driver 1023 may provide output signals to the output device 112, the output signals including content (e.g., media content 214, resource data 216, and/or other content that may be included in a graphical user interface) to be presented by the output device 112 for experiencing by a user. For example, the output driver 1023 may provide a program guide graphical user interface ("GUI"), control menu GUI, recording menu GUI, or other GUI to the output device 112 for presentation to the user. The output driver 1023 may include any combination of hardware, software, and firmware as may serve a particular application.

As mentioned, the media content processing subsystem 110-1 may be coupled to an output device 112 configured to present content, including media content 214 and/or resource data 216, to an end user. The output device 112 may display, play, or otherwise present the content for experiencing by the user. The output device 112 may include, but is not limited to, a television, computer monitor, mobile phone, handheld device, display screen, or any other device configured to present content to a user.

The output device 112 may be configured to display graphical user interfaces. Accordingly, content, including media content 214 and/or resource data 216, may be displayed in a graphical user interface.

2. Storage Devices

Storage device 1024 may include one or more data storage media, devices, or configurations and may employ any type, form, and combination of storage media. For example, the storage device 1024 may include, but is not limited to, a hard drive, network drive, flash drive, magnetic disc, optical disc, or other non-volatile storage unit. Various portions of media content may be temporarily and/or permanently stored in the storage device 1024.

The storage device 1024 of FIG. 10 is shown to be a part of the processing subsystem 110 for illustrative purposes only. It will be understood that the storage device 1024 may additionally or alternatively be located external to the processing subsystem 110.

The processing subsystem may also include memory 1025. Memory 1025 may include, but is not limited to, FLASH memory, random access memory ("RAM"), dynamic RAM ("DRAM"), or a combination thereof. In some examples, as will be described in more detail below, various applications used by the processing subsystem 110 may reside in memory 1025.

As shown in FIG. 10, the storage device 1024 may include one or more live cache buffers 1026. The live cache buffer 1026 may additionally or alternatively reside in memory 1025 or in a storage device external to the processing subsystem 110. In some examples, media content data may be temporarily stored in the live cache buffer 1026 to facilitate viewing of the media content in one or more trick play modes.

The processing subsystem 110 may be configured to record media content received from the VHO 220, as is well known. Recorded content may be temporarily and/or permanently stored in any of the storage device 1024, live cache buffer 1026, and memory 1025.

3. Tuner

Tuner 1027 may be configured to selectively receive content (e.g., media content) carried on a particular content channel. For example, tuner 1027 may be tuned to a particular content channel such that the content carried on the content channel is received and can be processed by the processing subsystem 110.

In some examples, the processing subsystem 110 may include multiple tuners 1027 such that content carried on different content channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 1027 is temporarily buffered, or stored, in the live cache buffer 1026. If there are multiple tuners 1027, there may be a live cache buffer 1026 corresponding to each of the tuners 1027.

While tuner 1027 may be used to receive various types of content-carrying signals transmitted (e.g., broadcast) by content delivery subsystem 105, processing subsystem 110 may be configured to receive other types of content signals (including media content signals, metadata, custom content, resource data, and/or program guide data signals) from the content delivery subsystem 105 without using a tuner. For example, content delivery subsystem 105 may transmit digital streams of data packets (e.g., Internet Protocol ("IP") based data packets) that can be received without using a tuner. For such types of content signals, the communication interface 1021 may receive and forward the signals directly to other components of the processing subsystem 110 (e.g., the processor 1028 or signal processing unit 1029) without going through the tuner 1027. For an IP-based signal, for example, the signal processing unit 1029 may function as an IP receiver.

4. Processors

As shown in FIG. 10, the processing subsystem 110 may include one or more processors, such as processor 1028 configured to control the operations of the processing subsystem 110. The processing subsystem 110 may also include a signal processing unit 1029 configured to process incoming content, including media content. The signal processing unit 1029 may be configured, for example, to demodulate and parse encoded digital media content. In some examples, the processing subsystem 110 may include one or more signal processing units 1029 corresponding to each of the tuners 1027.

In some examples, if incoming content is in the form of IP data packets (e.g., in IPTV configurations), the media content may be processed directly by the processor 1028 and/or any other processor configured to process IP data packets.

The processing subsystem 110 may also include a graphics engine 1030 configured to generate graphics that are to be provided to and displayed by the output device 112, The graphics may include graphical user interfaces ("GUIs") and their contents, including, but not limited to, one or more program guides, menus (e.g., control, recording, and playback menus), custom content, and other graphics.

5. Application Clients

One or more applications residing within the processing subsystem 110 may be executed upon initiation by a user of the processing subsystem 110, or upon the occurrence of another predetermined event. The applications, or application clients, may reside in memory 1025 or in any other area of the processing subsystem 110 and be executed by the processor 1028. As shown in FIG. 10, the processing subsystem 110 may include a user interface application 1031, which may be configured to direct one or more components of the processing subsystem 110 to generate and provide data representative of user interfaces (e.g., graphical user interfaces) to the output device 112 for presentation to an end user. The user interface application 1031 may be configured to generate and provide various types of end user interfaces, including, but not limited to, program guide user interfaces, control menu user interfaces, and recording information user interfaces, for example.

The user interface application 1031 may be configured to include custom content in user interfaces based on at least one association of the custom content that has been created by publisher 225 as described above. The custom content may be received from the content delivery subsystem 105 and utilized in any suitable manner, including in any of the ways that resource data 216 may be received and utilized as described in the aforementioned co-pending Ser. No. 11/693,267 patent application. Accordingly, when custom content has been received, validated, and published, the processing subsystem 110 is configured to use the custom content when generating user interfaces to which the custom content has been associated.

In certain examples, the user interface application 1031 may include instructions for generating a user interface, including locating and including content that has been associated with the user interface. Content in the user interface may include resource data 216, custom content that has been associated with the resource data 216, or a combination of the resource data 216 and the associated custom content. As described above, the custom content may be included in the user interface together with and/or in substitution of resource data 216.

Figure 11A:
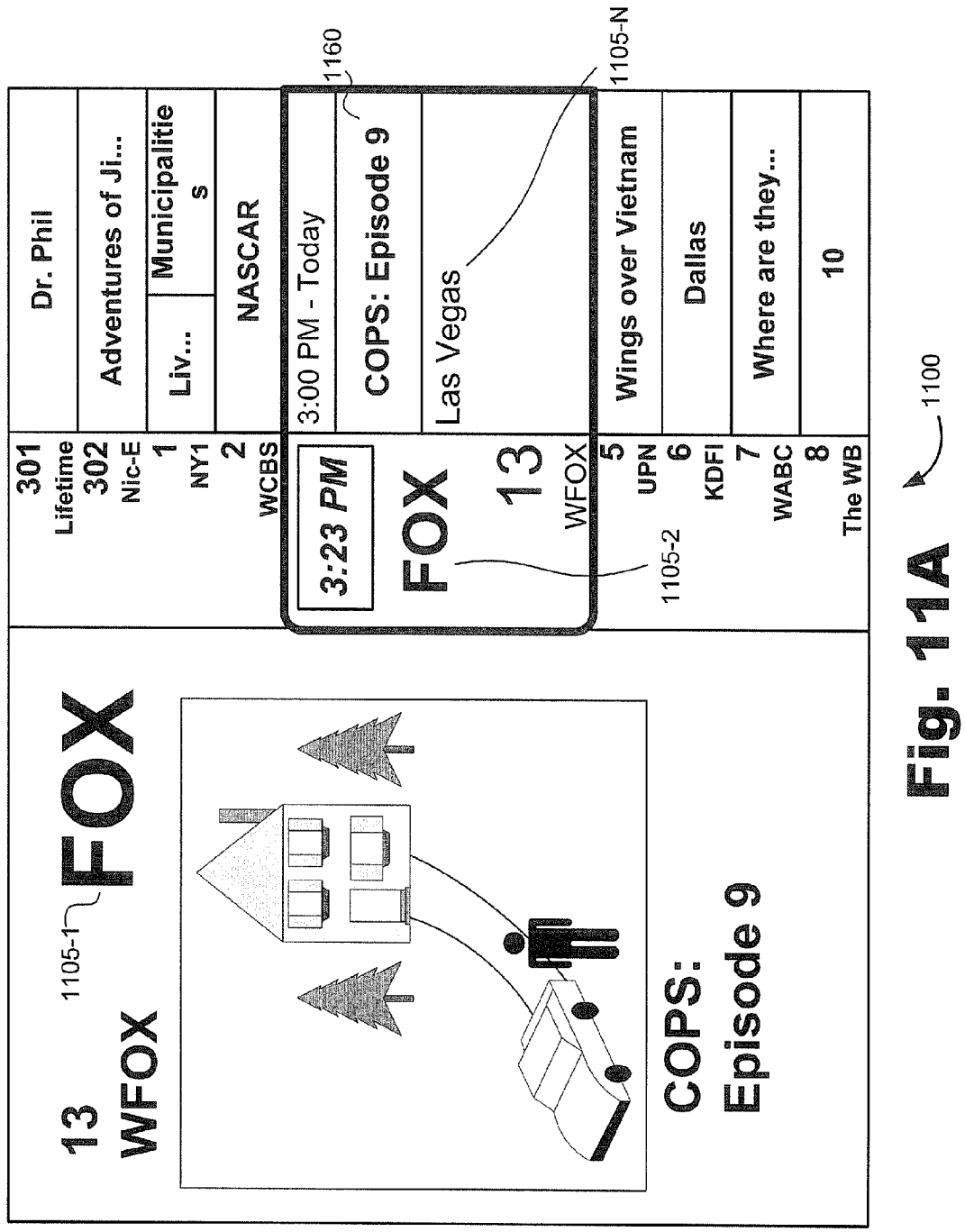
FIG. 11A illustrates an exemplary program guide user interface that may be presented to an end user.

For example, FIG. 11A illustrates an exemplary program guide graphical user interface 1100 ("GUI 1100") that may be generated by the processing subsystem 110 and presented to an end user by the output device 112. As shown, GUI 1100 may include a view of a partial screen program guide having resource data instances 1105-1 through 1105-N (collectively "resource data instances 1105") included therein. The resource data instances 1105 may be included in GUI 1100 by default and may include resource data 216 that has been received from a third party such as program guide data provider 107.

Content provider 106 may utilize the content customization portal 230 as described above to provide custom content and input associating the custom content with GUI 1100. Publisher may create an association between the custom content and one or more of the resource data instances 1105 such that processing subsystem 110 can utilize the association and include the custom content in GUI 1100 together with or in substitution of one or more of the resource data instances 1105.

Figure 11B:
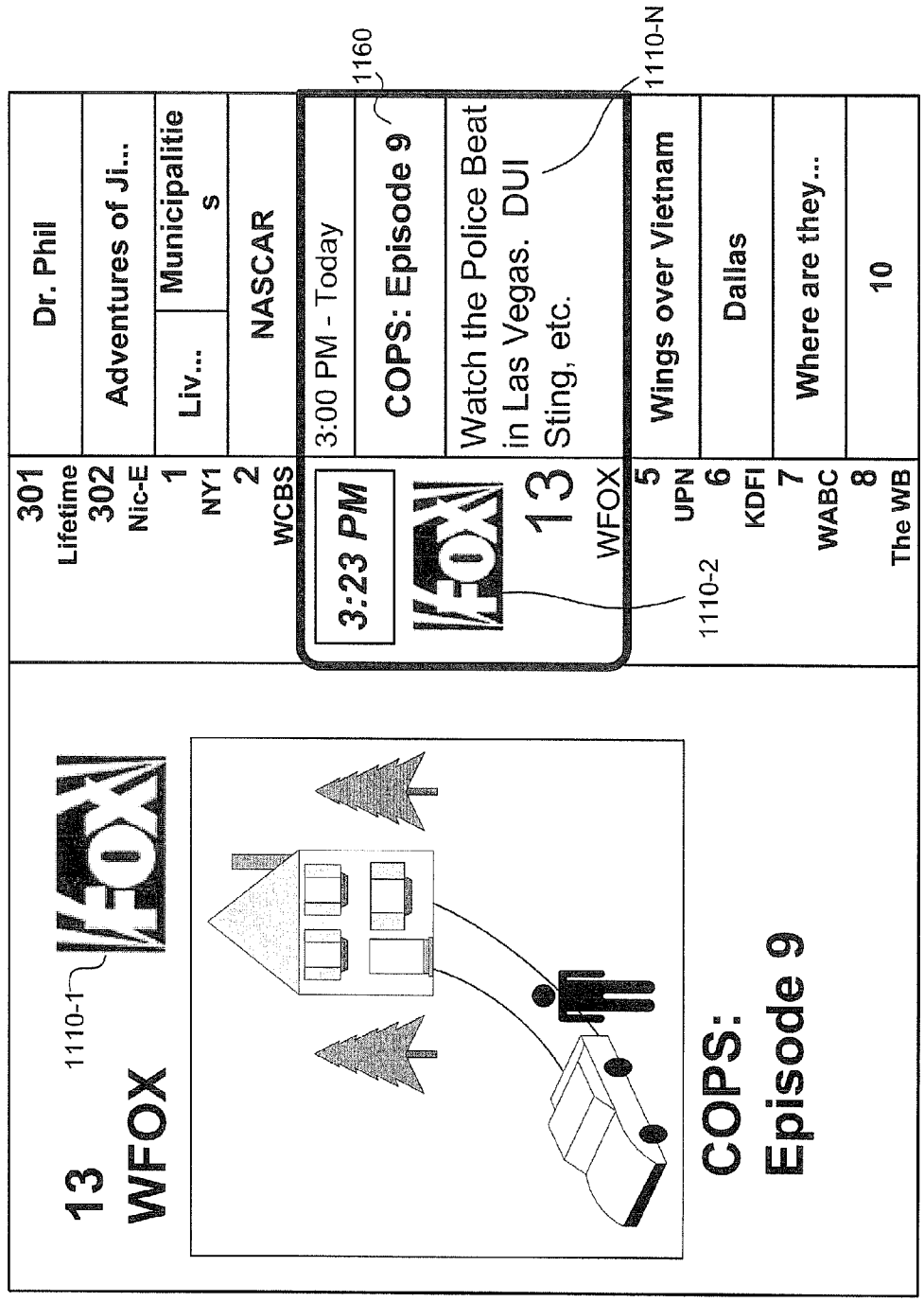
FIG. 11B illustrates the exemplary program guide user interface of FIG. 11A with custom content included therein.

FIG. 11B illustrates another exemplary program guide graphical user interface 1150 ("GUI 1150") that may be generated by the processing subsystem 110 and presented to an end user by the output device 112. GUI 1150 may be associated with the partial screen program guide template shown in FIG. 5 or 6 and the template preview shown in FIG. 7, as defined by content provider 106. Accordingly, GUI 1150 may include custom content identified and associated with the user interface by the content provider 106 using the content customization portal 230. As shown in GUI 1150, the generic background information of the partial screen program guide template has been populated with specific program guide data.

GUI 1150 may include a view of the partial screen program guide of FIG. 11A except that instances of custom content are included therein. In the example shown in FIG. 11B, GUN 1150 includes custom logo image 1110-1, custom logo image 1110-2, and custom text 1110-N (collectively "custom content instances 1110"), which have been included in GUI 1150 in substitution of resource data instances 1105-1, 1105-2, and 1105-N, respectively.

The custom content instances 1110 may also be said to have been included in GUI 1150 is association with other resource data 216 that was also included in GUI 1100. For example, media program title "COPS: Episode 9," identified as reference number 1160 in FIGS. 11A-B, may be an instance of resource data 216 that is included in GUI 1100 and GUI 1150. Custom content instance 1110-N may be associated with and presented together with media program title 1160 in GUI 1150.

Figure 12:
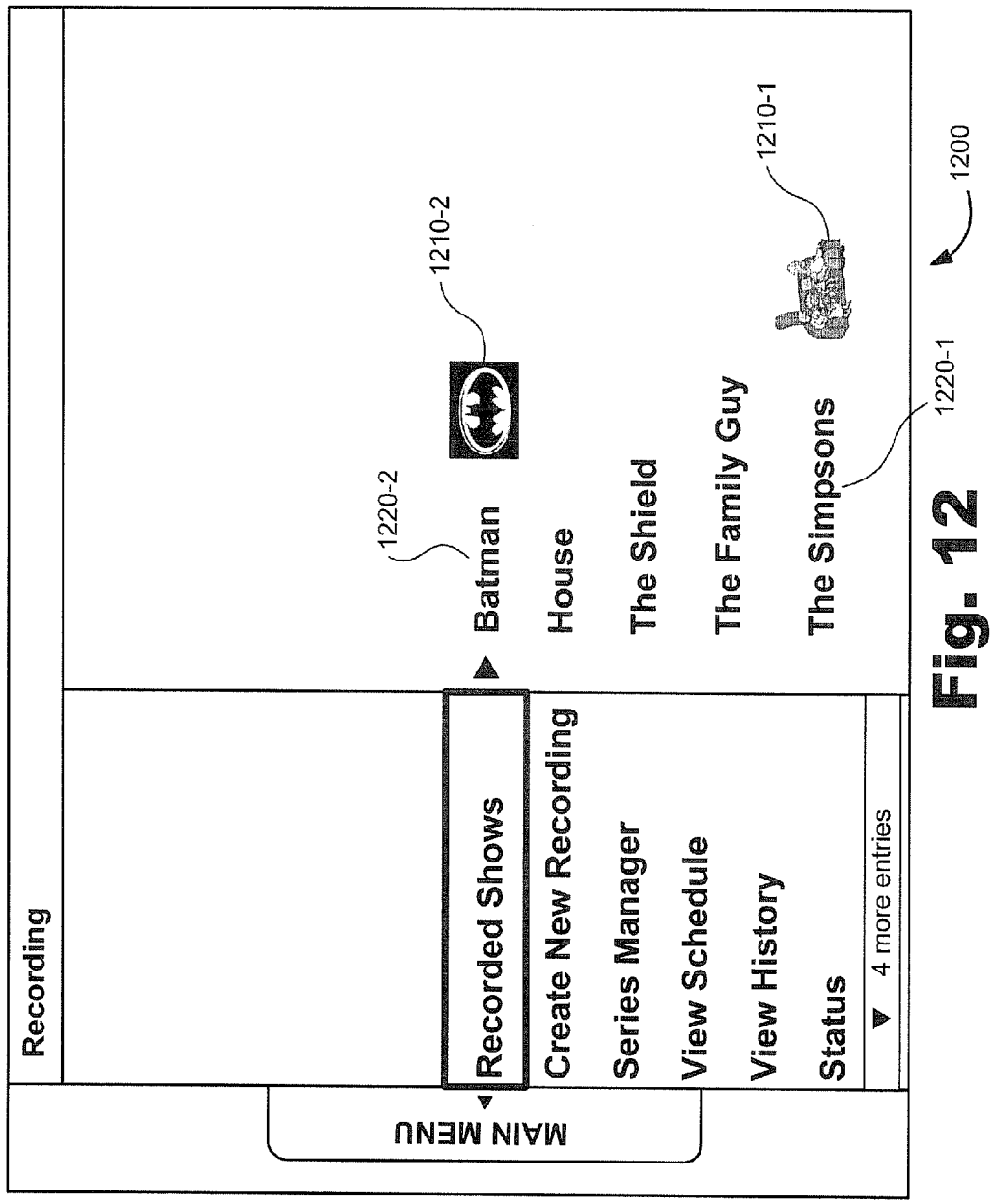
FIG. 12 illustrates an exemplary media recording user interface that may be presented to an end user.

FIG. 12 illustrates an exemplary recording menu graphical user interface 1200 ("GUI 1200") that may be generated by the processing subsystem 110 and presented to an end user by the output device 112. GUI 1200 may be associated with the recording menu template shown in FIG. 9 and may include custom content as defined by content provider 106 using the content customization portal 230. As shown in GUI 1200, the generic background information of the recording menu template has been populated with specific recorded media content program data.

GUI 1200 may include a view of a recording menu and instances of custom content included therein. In the example shown in FIG. 12, GUI 1200 includes a custom content instance 1210-1 displayed in association with resource data 216 in the form of an indication (e.g., a media program title "The Simpsons" 1220-1) of media content that has been recorded by the processing subsystem 110. The custom content instance 1210-1 may be displayed together with the indication of recorded media content based on an association defined by content provider 106 via the content customization portal 230.

Custom content provided by other content providers through the portal 230 may also be included in user interfaces generated by the processing subsystem 110. For example, GUI 1200 includes another custom content instance 1210-2 presented in association with a media content program title "Batman" 1220-2. Custom content 1210-2 may be provided by another content provider using the portal 230. Accordingly, an end user interface may include an aggregation of custom content received from different content providers via the content customization portal 230.

Through the content customization portal 230, content provider 106 is provided tools to exercise significant control over the information that will be presented to end users. The content provider 106 may utilize portal 230 to promote the content provider 106 and/or media content in ways that are expected to increase positive responses of end users toward the media content and/or its provider. For example, the content provider 106 may utilize the portal 230 to provide customized and dynamic branding of its products and services. In addition, the portal 230 and tools provided therein may help a content distributor attract an increased number and quality of media content providers and media content programs as compared to those attracted by traditional content distributors.

The system 100 may be used for generating revenue for access and use of the portal 230 and tools included therein. In certain implementations, for example, content provider 106 may be charged a fee for access to and use of the portal 230 and its content customization tools. The fee structure may be a flat rate, a charge per view (e.g., a charge for each time and end user interface is populated with a custom content instance) fee, a subscription fee, a combination thereof, or any other suitable fee arrangement. An additional or increased fee amount may be charged for use of certain features of the portal 230, such as templates and placeholders, for example III. Exemplary Process View FIG. 13 illustrates an exemplary method of receiving, processing, and providing content, including media content, resource data, and associated custom content. While FIG. 13 illustrates exemplary steps according to one implementation, other implementations may omit, add to, reorder, and/or modify any of the steps shown in FIG. 13.

In step 1310, media content 214 is received from a content provider 106. Step 1310 may be performed in any of the ways described above, including head end 210 receiving data representative of media content 214 from content provider 106.

In step 1320, the media content 214 is maintained. Step 1320 may be performed in any of the ways described above, including head end 210 storing the received media content 214 in head end data store 212.

In step 1330, resource data 216 associated with the media content 214 and/or the content provider 106 is maintained. Step 1330 may be performed in any of the ways described above, including head end 210 storing the resource data 216 in head end data store 212.

In step 1340, at least a subset of the resource data 216 is provided to a content processing subsystem 110 over a network 111, the provided resource data 216 being configured for inclusion in a user interface for presentation to an end user. Step 1340 may be performed in any of the ways described above.

In step 1350, a content customization portal 230 is provided for access by the content provider 106. Step 1350 may be performed in any of the ways described above, including publisher 225 providing content customization portal 230 to content provider 106.

In step 1360, a content provider 106 accessing the content customization portal 230 is authenticated. The authentication may be performed in any of the ways described above and may be used to identify media content 214 and/or resource data 216 associated with the content provider 106.

In step 1370, custom content is received from the content provider 106. Step 1370 may be performed in any of the ways described above, including receiving custom content from the content provider 106 via the content customization portal 230.

In step 1380, the custom content is validated. Step 1380 may be performed in any of the ways described above.

In step 1390, the custom content is provided to the content processing subsystem 110 for inclusion in the user interface for presentation to the end user. Step 1390 may be performed in any of the ways described above, including head end 210 publishing the custom content by transmitting or otherwise making it available to VHO 220. Step 1390 may also include VHO 220 providing the custom content to the content processing subsystem 110 over network 111. As described above, the custom content may be included in the user interface based on an association between the custom content and the resource data 216, the association having been created based on input received from the content provider 106.

IV. Alternative Implementations

The preceding description has been presented only to illustrate and describe exemplary implementations with reference to the accompanying drawings. It will, however, be evident that various modifications and changes may be made thereto, and additional implementations may be implemented without departing from the scope of the invention as set forth in the claims that follow. The above description and accompanying drawings are accordingly to be regarded in an illustrative rather than a restrictive sense.

What is claimed is:

1. A system comprising:
a television content delivery subsystem configured to receive television media content from a television content provider and transmit the television media content over a network to a television content processing subsystem configured to process and provide the television media content for presentation to an end user, wherein the television content provider and the end user are different entities;
wherein the television content delivery subsystem is further configured to
maintain resource data associated with at least one of the television media content and the television content provider,
make at least a subset of the resource data available to the television content processing subsystem for inclusion in an end user interface for presentation to the end user,
provide a content customization portal for backend access by the television content provider to the television content delivery subsystem, the content customization portal including at least one template provided to the television content provider, the template visually representing a layout of the end user interface and configured to allow the television content provider to associate custom content with a spatial position in the template and the end user interface, the custom content including at least a title for a media program and a description of the media program provided by the television content provider through the content customization portal,
authenticate the television content provider accessing the content customization portal,
receive the custom content from the authenticated television content provider via the content customization portal, and provide the custom content to the television content processing subsystem for inclusion in the end user interface.

2. The system of claim 1, wherein the television content delivery subsystem is configured to provide the custom content to the television content processing subsystem for inclusion in the end user interface in substitution of the resource data.

3. The system of claim 1, wherein the television content delivery subsystem is configured to provide the custom content to the television content processing subsystem for inclusion in the end user interface in association with the resource data.

4. The system of claim 1, wherein the resource data includes program guide data received from a program guide data provider, the end user interface comprising a program guide user interface.

5. The system of claim 1, wherein the resource data includes at least one of media content metadata, program guide data, and user interface graphics.

6. The system of claim 1, wherein the television content delivery subsystem is configured to receive input from the television content provider via the content customization portal and to create an association between the custom content and the resource data based on the television content provider input.

7. The system of claim 1, wherein the at least one template includes at least one of a program guide template corresponding with a program guide end user interface, a control menu template corresponding with a control menu end user interface, and a media content recording template corresponding with a media content recording end user interface.

8. The system of claim 1, wherein the at least one template provided to the television content provider in the content customization portal includes a placeholder displayed within the template.

9. The method of claim 8, wherein the placeholder visually indicates a recommended or maximum allowable spatial size for the element of the custom content in the end user interface.

10. The system of claim 1, wherein the television content delivery subsystem is configured to maintain a library of television media content programs received from the television content provider, the content customization portal including at least one tool enabling the television content provider to select a television media content program from the library of the television media content programs and to provide input associating the custom content with the resource data associated with the selected television media content program.

11. The system of claim 1, wherein the custom content further comprises at least one custom image.

12. The system of claim 11, wherein the at least one custom image is a logo for the television content provider.

13. The system of claim 1, wherein the television content provider comprises at least one of a television network, a media production entity, and a studio.

14. The system of claim 1, wherein the custom content further comprises at least one of a channel ID and a call sign.

15. The system of claim 1, wherein the custom content is substituted for default content in the end user interface.

16. A system comprising:
a head end configured to receive television media content from a television content provider and to maintain the television media content, the head end being further configured to maintain resource data associated with at least one of the television media content and the television content provider;
a video hub office configured to receive the television media content from the head end and to provide the television media content over a network to at least one television content processing subsystem configured to process and provide the television media content for presentation to an end user, wherein the television content provider and the end user are different entities; and
a publisher configured to
provide a content customization portal for backend access by the television content provider to the publisher, the content customization portal including at least one template provided to the television content provider, the template visually representing a layout of an end user interface and configured to allow the television content provider to associate custom content with a spatial position in the template and the end user interface, the custom content including at least a title for a media program and a description of the media program provided by the television content provider through the content customization portal,
authenticate the television content provider accessing the content customization portal,
receive the custom content from the authenticated television content provider via the content customization portal,
create at least one association between the custom content and the resource data based on the television content provider input, and
provide the custom content to the video hub office, the video hub office being configured to provide the custom content to the television content processing subsystem for inclusion in the end user interface based on the at least one association.

17. The system of claim 16, wherein the network comprises a subscriber television network.

18. The system of claim 17, wherein the television content processing subsystem comprises a set-top box connected to the subscriber television network.

19. The system of claim 16, wherein the resource data includes program guide data received from a third party program guide data provider, the end user interface comprising a program guide user interface including the custom content and at least a subset of the program guide data.

20. The system of claim 16, wherein the television content processing subsystem is configured to record the television media content received from the video hub office and to generate the end user interface to include an indication of the recorded television media content and the custom content, based on the at least one association.

21. A method comprising:
receiving, by a television content delivery subsystem, television media content from a television content provider;
maintaining, by the television content delivery subsystem, the television media content;
maintaining, by the television content delivery subsystem, resource data associated with at least one of the television media content and the television content provider;
providing, by the television content delivery subsystem, at least a subset of the resource data to a television content processing subsystem over a network, the provided resource data being configured for inclusion in a user interface for presentation to an end user, wherein the television content provider and the end user are different entities;
providing, by the television content delivery subsystem, a content customization portal for backend access by the television content provider to the television content delivery subsystem, the content customization portal including at least one template provided to the content provider, the template visually representing a layout of the user interface and configured to allow the television content provider to associate custom content with a spatial position in the template and the user interface, the custom content including at least a title for a media program and a description of the media program provided by the television content provider through the content customization portal;

authenticating, by the television content delivery subsystem, the television content provider accessing the content customization portal;

receiving, by the television content delivery subsystem, the custom content from the authenticated television content provider via the content customization portal; and providing, by the television content delivery subsystem, the custom content to the television content processing subsystem for inclusion in the user interface for presentation to the end user.

22. The method of claim 21, the step of providing the custom content including providing the custom content to the television content processing subsystem for inclusion in the user interface in substitution of the resource data.

23. The method of claim 21, the step of providing the custom content including providing the custom content to the television content processing subsystem for inclusion in the user interface in association with the resource data.

24. The method of claim 21, further comprising receiving, by the television content delivery subsystem, program guide data from a third party program guide data provider, the resource data including the received program guide data.

25. The method of claim 24, further comprising providing, by the television content delivery subsystem, the user interface to an output device for presentation to the end user, the user interface including a program guide user interface.

26. The method of claim 21, further comprising:
receiving, by the television content delivery subsystem, input from the television content provider via the content customization portal; and
creating, by the television content delivery subsystem, an association between the custom content and the resource data based on the television content provider input.

27. The method of claim 21, further comprising providing, by the television content delivery subsystem, at least one placeholder in the template.

28. The method of claim 21, further comprising:
maintaining, by the television content delivery subsystem, a library of television media content received from the television content provider;
receiving, by the television content delivery subsystem, input from the television content provider, the input including a selection of a television media content program included in the library of television media content; and
creating, by the television content delivery subsystem, an association between the custom content and the resource data associated with the selected television media content program.

29. The method of claim 21, further comprising:
generating, by the television content delivery subsystem, the user interface, the generated user interface including the custom content either in association with or in place of the resource data; and
providing, by the television content delivery subsystem, the generated user interface for presentation to the end user.

* * * * *